United States Patent
Morrow

(10) Patent No.: US 8,095,425 B2
(45) Date of Patent: *Jan. 10, 2012

(54) SYSTEM, METHOD, AND ARCHITECTURE FOR IMPLEMENTING A BUSINESS INFINITI SHARING RESIDUAL WITH SUBSCRIBERS AND/OR AFFINITY PARTNERS

(76) Inventor: Larry Morrow, Dallas, TX (US)

(*) Notice: Subject to any disclaimer, the term of this patent is extended or adjusted under 35 U.S.C. 154(b) by 735 days.

This patent is subject to a terminal disclaimer.

(21) Appl. No.: 11/900,091

(22) Filed: Sep. 10, 2007

(65) Prior Publication Data

US 2008/0027829 A1    Jan. 31, 2008

Related U.S. Application Data

(63) Continuation-in-part of application No. 10/006,595, filed on Dec. 5, 2001, now Pat. No. 7,269,572.

(60) Provisional application No. 60/251,453, filed on Dec. 5, 2000, provisional application No. 60/260,822, filed on Jan. 10, 2001.

(51) Int. Cl.
    *G06Q 30/00* (2006.01)
(52) U.S. Cl. .................. 705/26.1; 705/27.1

(58) Field of Classification Search ............ 705/26, 705/27

See application file for complete search history.

(56) References Cited

U.S. PATENT DOCUMENTS

| 2001/0048737 A1* | 12/2001 | Goldberg et al. | 379/114.13 |
| 2002/0002495 A1* | 1/2002 | Ullman | 705/21 |
| 2002/0007334 A1* | 1/2002 | Dicks et al. | 705/37 |
| 2003/0046147 A1* | 3/2003 | Bondy | 705/14 |

OTHER PUBLICATIONS

The role of affinity groups: Alternatives to consolidation Olsztynski, Jim Plumbing & Mechanical ? v17n10 ?pp: 48 Dec. 2000.*

* cited by examiner

*Primary Examiner* — Jeffrey A Smith
*Assistant Examiner* — Resha Desai
(74) *Attorney, Agent, or Firm* — Robert C. Klinger

(57) ABSTRACT

The invention is a business system that incorporates Affinity organizations and secondary affinity organizations to secure subscribers as buyers for affiliate organization products. In one embodiment, purchases are made through a customizable purchasing platform that, when visited by a subscriber, appears to be a web site administered by the subscriber's partner.

3 Claims, 4 Drawing Sheets

SYSTEM, METHOD, AND ARCHITECTURE FOR IMPLEMENTING A BUSINESS INFINITI SHARING RESIDUAL WITH SUBSCRIBERS AND/OR AFFINITY PARTNERS

RELATED APPLICATIONS

The application is a Continuation-in-Part of U.S. patent application Ser. No. 10/006,595, filed Dec. 5, 2001 now U.S. Pat. No. 7,269,572 entitled "SYSTEM, METHOD, AND ARCHITECTURE FOR IMPLEMENTING A BUSINESS IFINITI ON AN INFORMATION NETWORK", which claims priority from U.S. Provisional Patent Application No. 60/251,453 filed on Dec. 5, 2000, and to U.S. Provisional Patent Application No. 60/260,822 filed on Jan. 10, 2001, both of which are incorporated by reference herein in their entirety.

BACKGROUND

1. Technical Field of the Invention

The invention relates generally to business methods and information networks, such as the internet or wireless internet, and more particularly, the invention relates to systems, methods and architectures for implementing a business on the information network.

2. Prior Art

Most organizations, particularly non-profit organizations, receive funds from supporters in the form of donations, from members in the form of dues, or through general fundraisers. Thus, the preponderance of income to these organizations is obtained through proactive efforts, and these are sometimes only marginally successful. Furthermore, any success with fund generation is often negatively effected by marketing expenses and administrative overhead.

Some organizations have been able to generate additional funds by leveraging participation with service providers that generate predictable, periodic, residual income, such as long distance providers, internet providers, and insurance companies. However, these sources of residual income are not without cost. Recruiting them, designing a program to use with them, and actually using them requires substantial activity, such as active participation, negotiation, accounting, and marketing. Because of these costs, many organizations choose not to pursue a relationship with potential residual income partners, often deeming such relationships "too much trouble" or "not worth the effort."

Presently, there is not a program that provides income or value similar to that generated by the invention (also called the Ifiniti business system) to primary partners (also called Affinity Partners) and secondary Affinity partners and subscribers. Accordingly, the invention provides a unique business system for marketing, promotion, and revenue generation.

SUMMARY

The invention provides technical advantages as a business system that supplies several unique features. The business system generally includes an affiliate organization that provides a good or a service, and a partner called an Affinity organization that has a plurality of members. A subscriber may purchase a good or service provided by an affiliate organization preferably through a single web site, the Ifiniti web site, which is configured so that when a member accesses the Ifiniti web site (perhaps from a direct link from an Affinity organization's own web page), the Ifiniti web site appears to be a web site administered by the partner.

The Ifiniti business system utilizes the power of Affinity organizations and the loyalty and support of secondary partners, and their supporters, fans, and members to generate substantial income from already loyal customer bases. Preferably, participation with Ifiniti by the Affinity/Secondary Affinity partners will be passive, which means that there will not be a need to enter negotiations with other partners, or a need to deal with single providers. Furthermore, Affinity organizations will not need to keep accounting records or hassle with administration. Another feature of the invention is that it creates value for the Affinity partner organization and/or secondary partner organization through equity sharing.

Some Affinity organizations may participate with other "unlinked" product and service providers to generate income for Affinity organizations, exclusively. In addition, internet technology and proprietary software applications allow Ifiniti to link together affiliate providers and Affinity partners to allow consistent application of the Ifiniti business system. Another feature of the invention is the ability to make and fulfill orders through a variety of communication means, such as information networks, wire or wireless internet, Personal Digital Assistants, telephones, smart cards (such as American Express's™ smart card program), or cell phones, on-line or in person for example. Simultaneous with purchasing, the tracking and accounting operations are provided—this enables, in part, residual income to be paid accurately to primary, secondary partners and subscribers.

One of the features of the Ifiniti Business System is tapping the power of the Affinity relationship between the Affinity organization and its supporters. Enabling those same supporters savings on all purchases while passing along residual income to their Affinity organizations and in turn their secondary partners.

Of course, other features and embodiments of the invention will be apparent to those of ordinary skill in the art. After reading the specification, and the detailed description of the exemplary embodiment, these persons will recognize that similar results can be achieved in not dissimilar ways. Accordingly, the detailed description is provided as an example of the best mode of the invention, and it should be understood that the invention is not limited by the detailed description. Thus, the invention is read as being limited only by the claims.

BRIEF DESCRIPTION OF DRAWINGS

Various aspects of the invention, as well as an embodiment, are better understood by reference to the following DETAILED DESCRIPTION. To better understand the invention, the DETAILED DESCRIPTION should be read in conjunction with the drawings in which.

DETAILED DESCRIPTION

Introduction

Figure 1:
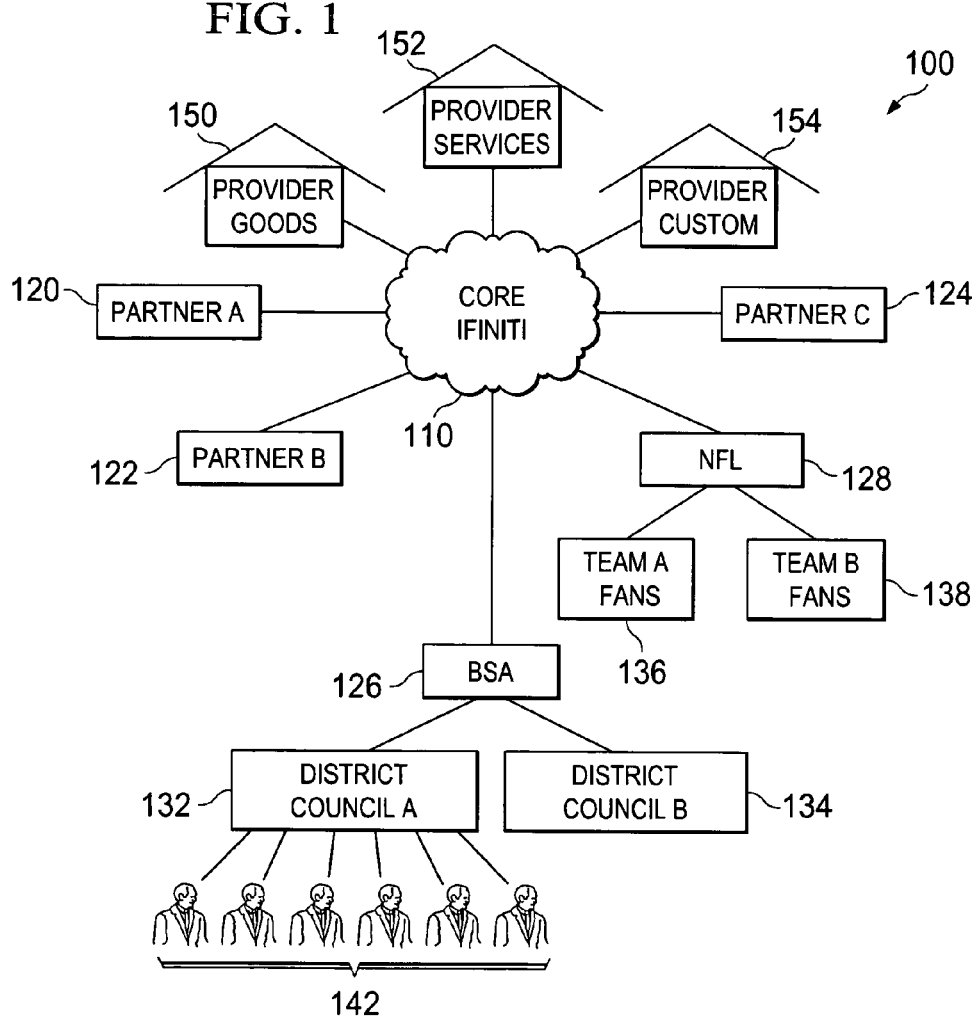
FIG. 1 illustrates an exemplary architecture for implementing the invention.

The Ifiniti business system (which may be called Ifiniti, the core business, or the invention) was designed, conceived, and created for the common good and benefit of humane, educational and charitable organizations globally. The Ifiniti business system calls for an Ifiniti organization to bear the expense of national advertising, for the Ifiniti organization to configure Affinity/Secondary partner websites to link seamlessly to a common Ifiniti organization portal, and for the Ifiniti organization to provide online purchase capabilities for each and every purchase that a subscribers wishes. Over time, the achievement of these goals increases residual payments to partners of the Ifiniti organization, called Affinity and Secondary affinity partners, which also form part of the Ifiniti business system.

Accordingly, income to the Ifiniti organization may be distributed throughout the Ifiniti business system, and thus may be distributed to Affinity/Secondary Affinity partners. This income is generated through subscribers' purchase of various products and services, preferably provided by affiliate partners. Affiliate partners pay a percentage of a purchase amount to the Ifiniti organization for distribution throughout the Ifiniti organization according to contractual arrangements made between Ifiniti and Affinity partners, and secondary partners (and optionally, lower level partners), and subscribers.

Interpretation Considerations

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for -functioning-" or "step for -functioning-" in the claims section.

DESCRIPTION OF THE FIGURES

FIG. 1 illustrates an exemplary architecture for implementing one embodiment of the invention, the Ifiniti business system 100. The business system 100 implements a core business 110, which is preferably the Ifiniti organization, and enlist a plurality of Affinity organizations as partners 120, 122, 124, 126, 128. To implement the business system 100 an order processing system is maintained by the core Ifiniti 110 for routing orders. The Ifiniti business organization 100 is enabled to receive orders for a good or a service from a member of an Affinity organization who subscribes to the Ifiniti 100.

Thus, the system can be viewed as comprising affiliate organizations 150, 152, 154, who are typically providers of goods or services for purchase (including customized goods and services), and Affinity partners 120, 122, 124, 126, 128 that have a plurality of members who can subscribe to the Ifiniti 100, and purchase products from the affiliate organizations 150, 152, 154 through the core Ifiniti 110.

Typically, the Affinity partners 120, 122, 124, 126, 128 are existing organization. These organizations have Subscribers who become "subscribers" after they subscribe to Ifiniti. A Subscriber of an Affinity organization who makes a purchase is defined as a customer. Preferably the core Ifiniti business provides a web site which maintains the software needed to implement the Ifiniti business system (thus making the core business the business system provider). The Ifiniti business system includes software that maintains, from a Subscriber, the appearance of an Affinity organization. Accordingly, if a Subscriber signs on to their Affinity organization's web page, and then links into the core Ifiniti web site, then the Ifiniti web site appears to that member as a web site operated by that member's Affinity organization. In addition, the core Ifiniti web site provides a web site and/or customization tools for the core Ifiniti web site so that when a member accesses the Ifiniti web site directly, the Ifiniti web site appears to be a web site of the Affinity organization that Subscriber is sponsored by.

For example, a Boy Scouts of America™ (BSA) partner 126 may be engaged into the Ifiniti business system 100, and may engage district counsels, such as district counsel A 132 and district counsel B 134, as secondary Affinity partners. Secondary Affinity partners have full rights of participation, as described for the Affinity partners, such as stock option rights and income distribution rights, a web page, and the right to engage additional Affinity partners, such as scout troops. Accordingly, district counsel A 132 could solicit its supporters 142 directly to subscribe to the Ifiniti business system as illustrated in FIG. 1, or could enlist scout troops as Subscribers 142. Likewise, scout troops could enlist Subscribers.

Similarly, a National Football League™ (NFL)™ Affinity partner 128 could engage members directly, or could engage secondary Affinity organizations, such as Team A 136 and Team B 138, who would then engage supporters (fans) as subscribers. Accordingly, when a fan of Team A subscribes to Ifiniti and accesses the core Ifiniti Website to purchase products or services, it will appear to the Subscriber that Team A is running the web page the member visits.

In one embodiment, a Subscriber may link to the Ifiniti organization from an Affinity partner's web site or a secondary partner website. Accordingly, the core business's web site provides a first Affinity partner or secondary partner web page by storing at least a web page template, customizing the template to create an Affinity partner or secondary partner web page, and by displaying the Affinity partner/secondary partner web page to that Affinity/Secondary partner Subscribers when that Affinity/Secondary partner's Subscribers access the Ifiniti web site.

Figure 2:
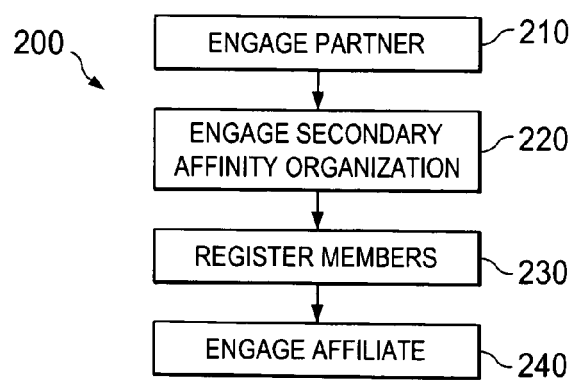
FIG. 2 is a block-flow diagram of a creation algorithm for registering members.

FIG. 2 is a block-flow diagram of a creation algorithm 200 for creating an Ifiniti business system, and for registering supporters/fans as subscribers. The creation algorithm 200 begins in an engage partner act 210 wherein an Affinity partner is engaged to join the Ifiniti business system. Some incentives for joining the Ifiniti business system are that the Affinity partner's Subscribers and secondary Affinity partners Subscribers receive discounts for purchases made through the business system 100, and that affiliate organizations receive special promotions and benefits from Ifiniti (the core business) for their products and services that non-affiliates do not receive.

When an Affinity partner is engaged with the Ifiniti business system, the Affinity partner may wish to engage a subentity as a separate Affinity partner (a secondary Affinity partner) in an optional engage secondary Affinity organization act 220. The secondary Affinity partner can then enjoy all the benefits of partnership in the Ifiniti business system. Then, in a register members act 230, supporters of the Affinity partner and/or the secondary Affinity partner may then be registered (engaged) with Ifiniti, and thereby become subscribers. Preferably, Affinity partners, secondary Affinity partners, and members are engaged prior to engaging an affiliate organization provider to offer a product or service for purchase in an engage affiliate act 240.

Figure 3:
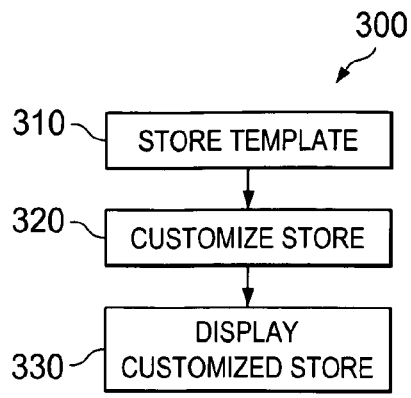
FIG. 3 is a flow chart illustrating a method for creating a customized web site.

FIG. 3 is a flow chart illustrating a web page creation algorithm 300 that may be used by the core business to create a customized web site, which may be accessed by the Subscriber directly, or preferably through a link from an Affinity/Secondary Affinity partner's web site. First, in a store template act 310, the core business stores at least a first template which may be used to direct a subscriber to an affiliate organization who sells goods and services to a subscriber. Then, in a customize store act 320, the template is customized so that it will look and feel like the web site for the partner or affiliate partner to which the Subscriber belongs. Accordingly, in a display customized store act 330, a customer accesses the web site either directly or through a link from the customer's partner web site. In one embodiment, the core business uses a cookie to identify the user as a customer having an associated partner, or uses a link cookie to identify the web site from which the customer linked to the core web site.

Figure 4:
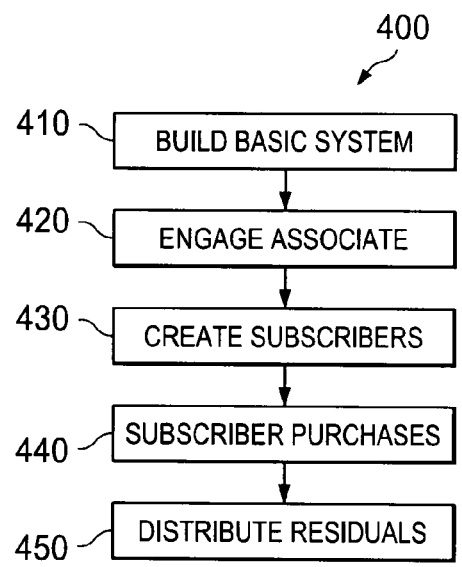
FIG. 4 shows a simplified block-flow diagram of a method of executing the Ifiniti system.

FIG. 4 shows a simplified block-flow diagram of a method of executing the Ifiniti system, illustrated as an Ifiniti algorithm 400. In an Ifiniti system, the Ifiniti algorithm 400 first builds a core business on the internet, by generally contractually enlisting Affinity/Secondary Affinity partners, who may have a plurality of supporters, enlisting supporters of the partner as a subscriber, and then by enlisting an affiliate organization provider to offer a good or service for purchase by a subscriber in a build basic system act 410. It should be noted that preferably stock options, or actual shares of stock, may be distributed to the Affinity partners and secondary Affinity partners in the build basic system act 410. According to number of subscribers of each Affinity/Secondary partner organizations.

Next, in an engage associate act 420, a partner may enlist or recruit an associate organization as a secondary Affinity organization. For example, the district counsels of the BSA are associated organizations. Each Affinity partner chooses their secondary Affinity partners to participate in the residual profits paid on purchases by Subscribers of the Affinity partners and secondary Affinity partners. Preferably, affiliate organization providers offer savings and "one-stop" cash or credit card convenience and savings via volume discounts to Ifiniti subscribers. In addition, each affiliate organization provider pays a contractually agreed upon percentage of purchases by Ifiniti subscribers (Affinity/Secondary Partners Subscribers) to Ifiniti on a monthly basis for distribution to Affinity partners and secondary Affinity partners, and Subscribers.

Then, members (such as fans of a sports team, supporters, or followers of the Affinity partner or secondary partner) enlist into and engage the Ifinity system as subscribers in a create subscribers act 430 (all subscribers must choose an Affinity/Secondary Affinity partner when subscribing to Ifiniti).

Thus, the secondary partners' supporters and fans may subscribe to Ifiniti and become consumers to numerous affiliate partners by purchasing products and services. Eventually, a subscriber will purchase a product or service through the Ifiniti system in a purchase act 440. Then, preferably periodically, the Infiniti system distributes residual profits of the Ifiniti organization to the Ifiniti system Affinity partners, secondary Affinity partners, and Subscribers in a distribute residuals act 450.

Figure 5:
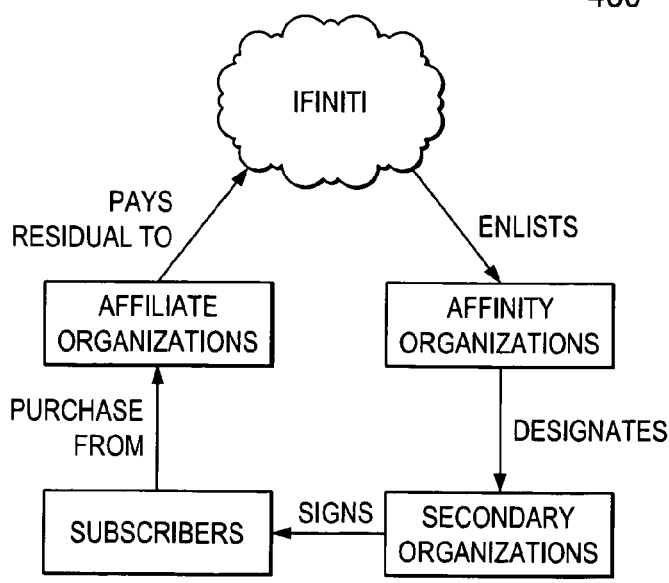
FIG. 5 is a flow chart that illustrates how the elements of the Ifiniti business system work together.
Figure 6:
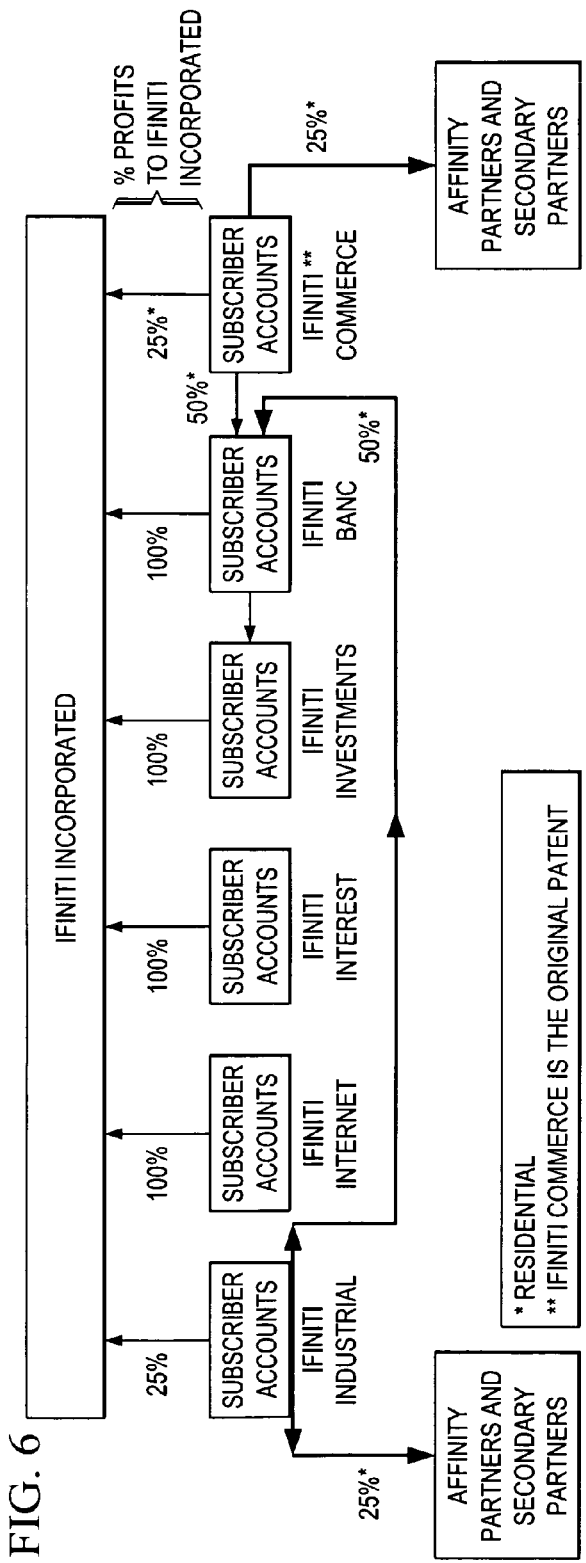
FIG. 6 is a block diagram of another preferred embodiment of the Ifiniti business system.
Figure 7:
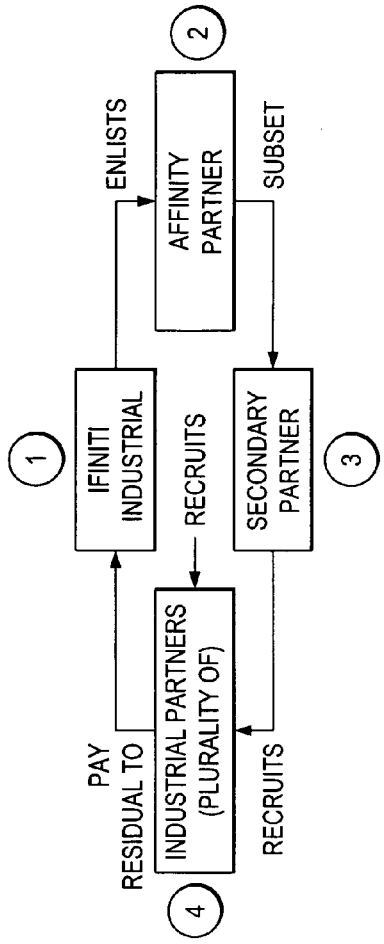
FIG. 7 is a block diagram of a four leg business arrangement.
Figure 8:
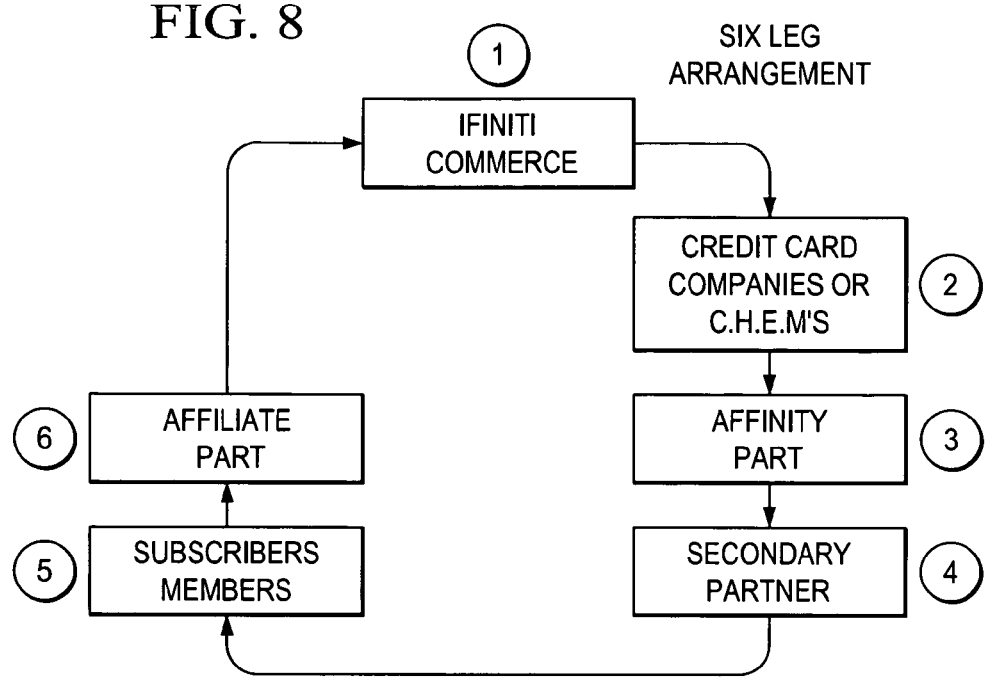
FIG. 8 is a block diagram of a six leg business arrangement.
Figure 9:
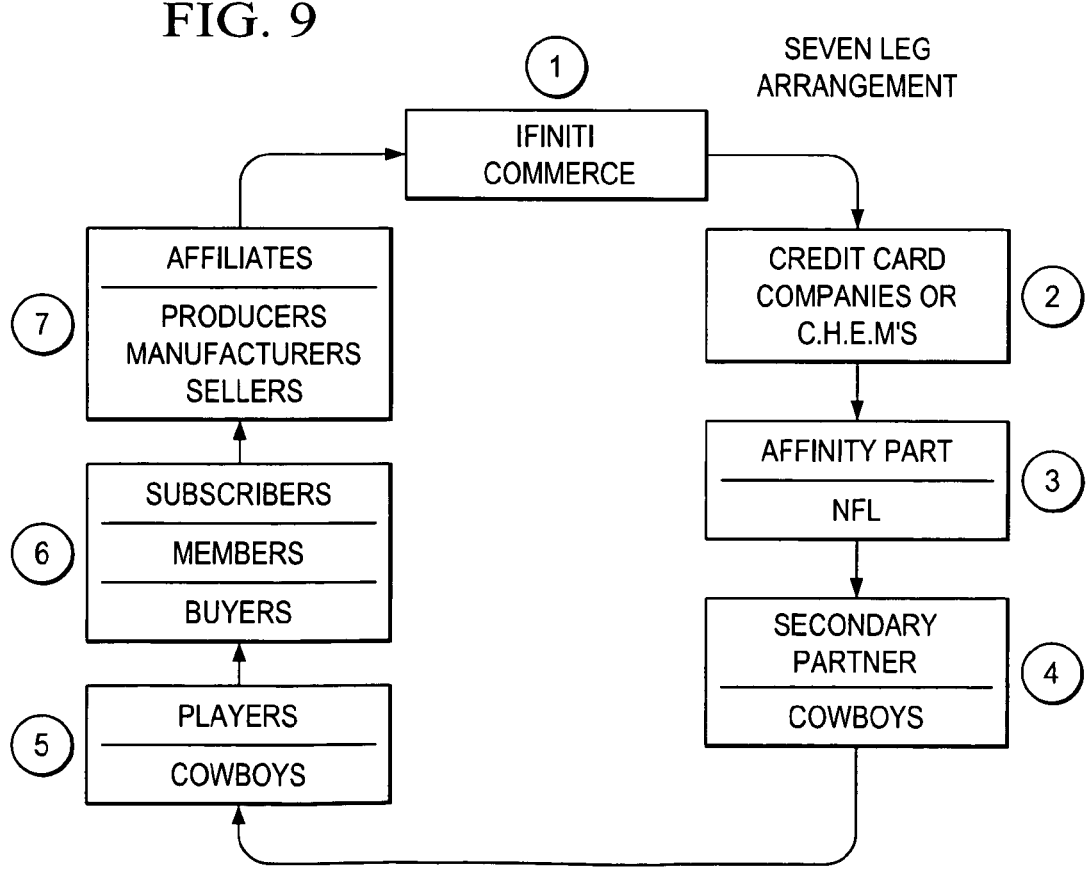
FIG. 9 is a block diagram of a seven leg business arrangement.

FIG. 5 is a flow chart that illustrates how the elements of the Ifiniti business system work together. In general, the Ifiniti business system begins with the Ifiniti core business, which enlists Affinity organization partners, such as the BSA or NFL, as outlined above. Then, preferably, the Affinity organization partners designate any secondary organization partners, such as district counsels and teams. Next, the supporters (such as in the case of teams, fans) sign-up with or subscribe to the Ifiniti business system, through Affinity/Secondary Partners and by doing so become subscribers. Subscribers may in fact take the form of family or organizational memberships, and by becoming a subscriber, the member may make purchases from affiliate organizations at reduced prices.

It should be noted that the affiliate organizations may be enlisted with the Ifiniti business system at any point in time, and may become part of Ifiniti before an Affinity partner is enlisted, while enlisting an Affinity partner, or after an Affinity partner is enlisted. It should be noted that the Subscriber may be enlisted/signed with the Ifiniti Business system at any point. The making of a purchase by a subscriber from an affiliate organization results in the transfer of residual revenue from the affiliate organization to the Ifiniti organization for distribution.

Motivations to Participate for Participants in the Ifiniti Business System

Organizations want to be Affinity partners and secondary partners for stock (equity sharing), for residual income (income sharing), for free advertising and marketing, and for stock dividends, which are preferably cash. Affiliate partners enjoy free banners on Ifiniti websites, free national advertising, access to Ifiniti subscribers, high profile of association with charities, non-profit, academic and religious organizations to benefit all humanity, increased sales volume from Ifiniti subscribers, and oblique endorsements to Ifiniti subscribers by participation with Ifiniti.

Subscribers want to participate for savings on purchases, for a sense of pride from earning residual income for purchases that support their Affinity group, for free enrollment in daily, monthly and annual lotteries, for simplicity in purchasing decisions by participating with a single source provider of bundled services and products. Perquisites for subscribers may include at least rewards, such as entertainment rewards, for active and long term subscribers, fanatical customer services, and the convenience of one-stop and one-site for all purchases.

Features of the Ifiniti System/Benefits to Affinity Partners

One feature of the invention is equity sharing. One possible plan for equity sharing is to award Affinity organizations stock options based on the number of subscribers from that organization, and to award stock options based on the number of subscribers from secondary partners. Approximately thirtyfive (35) percent of the outstanding voting stock could be owned by Affinity/Secondary Affinity organizations. This has the benefit of insuring that Affinity/Secondary Affinity partners will eventually substantially own and direct the corporation. Furthermore, as options are converted to stock, Affinity partners own a substantial equity position in Ifiniti.

Another feature of the Ifinity system is that the Profits of Ifiniti are divided at least four ways. They are divided between Ifiniti, the Affinity partner organizations/secondary Affinity partner organizations and Subscribers. Of course, if there are third-level or other-level Affinity partners, then they will also participate in profit sharing. In traditional profit sharing plans, only a small portion of actual profit is exposed to sharing. Ifiniti commerce allows participation in all profits.

One result of the equity sharing and profit sharing features is that they allow Ifiniti to have customers in place prior to marketing. In other words, Ifinity promotes the profit sharing and equity plans to build a network before having to promote products or services. This provides immediate, committed, loyal customers in volume. Previously, only after product(s) are ready to go to market are customers sought. Accordingly, one advantage of the Ifiniti Business System is that customers are in place before a product or services is ready for marketing. Contrast this to traditional marketing plans which attempt to generate customers after the product is ready to go to market.

Because Ifiniti subscribers can access all their shopping needs from a single site, Ifiniti offers simplicity and convenience in its purchasing structure. Because Ifiniti negotiates low prices on behalf of all its members, Ifiniti can offer high volume and negotiate low prices, which translates into savings and convenience on virtually all services and products purchased on the internet. In addition, Ifiniti pays a percentage of purchases back to the subscriber's Affinity Group/Secondary Affinity Group, which could be a charity, religious organization, or another chosen humanitarian organization. In some cases Affinity/Secondary Affinity partners may be required to contribute a portion of income from Ifiniti subscribers to a charity or humanitarian, educational, or medical organization. Internet technology and proprietary operating systems allow accurate linkage and financial accounting for purchases of untapped off-line and on-line sources of income.

Ifiniti Commerce Group

Referring now to FIG. 6-9, IFINITI (Now IFINITI Commerce) distributes total residual income as follows:
25%—Affinity partners/Secondary Affinity partners
25%—Ifiniti Inc.
50%—To Subscriber/Member Account at Ifiniti Banc.

Residual Distribution

Residual income to Ifiniti paid by affiliate partners is divided between subscribers, Affinity and secondary partners and Ifiniti. The portion paid to subscribers may be deposited to a banc—type entity, such as a financial institution, (Ifinit Banc) until a specified amount has accumulated in the account. This specified amount, when reached, will then be deposited into the Ifiniti investment accounts. the Ifiniti investment account will then be a long-term super-security account.

Ifiniti Banc Group

For instance, when $1,000 is accumulated in the subscriber/Member Account at Ifiniti Banc, the funds will then be automatically transferred to the subscriber/members new account at Ifiniti Investments.

Ifiniti Investments Group

The Subscriber/Member will then choose an investment portfolio to determine degree of risk and return. This account, will be a long term, super-security, retirement account paying management and other fees to Ifiniti Inc.

Ifiniti Interest Group

The Ifiniti Interest Group will receive an agreed amount on each credit card purchase by subscriber/members as a percentage of the purchase/transaction paid by the credit card companies and the credit card processing companies.

Additionally, Ifiniti Interest Group will receive income derived from interest and other fees charged on the monthly outstanding loan account balance.

Ifiniti Internet Group

Ifiniti Internet will generate income from multiple expanding, and evolving sources of sales opportunities. distributing the income to Ifiniti Inc.

Ifiniti Internet will offer free advertising to Affinity/Secondary partners, Affiliate Partners and Ifiniti Industrial Partners. Plus, online accounts for all subscribers/members to track and view all activities in their subscriber/members I-Banc and Ifiniti Investment accounts.

Infiniti Industrial Group

Ifiniti Industrial Group will facilitate Discounts from each Ifiniti industrial seller when a Sale is made at an agreed sales discount to another Ifiniti Industrial Partner. Each sale will yield income as an agreed percentage of the sale for ifiniti Industrial group and a chosen C.H.E.M.
C=Charity
H=Humanitarian
E=Educational
M=Medical Organization Ifiniti industrials enlists existing Affinity/Secondary partners or selects approved Affinity/Secondary organizations to in-turn solicit industrial organizations that sell to other industrial organizations.

The industrial organizations then agree to be a buyer and/or seller that offer a discount to other industrial organizations buyer/sellers at a predetermined, contracted discount, generating income for Ifiniti Industrial.

Income from discounts to be divided between Ifiniti Industrial Partners, Ifiniti Industrial (IFINITI) and Affinity/Secondary Partners.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. An electronic method of building an electronic business system on the internet, comprising:

using a first Affinity partner module to electronically purchase a good or service directly from one of a plurality of affiliate organization provider modules without using the electronic business system;

using a secondary Affinity partner module to purchase a good or service directly from one of the plurality of affiliate organization provider modules without using the electronic business system, the secondary Affinity partner modules being a subset of the first Affinity partner module; and offering a good or service for electronic purchase, via the plurality of affiliate organization provider modules, directly to the first Affinity partner module or the secondary Affinity partner module without using the electronic business system, the plurality of affiliate organization provider modules distributing a residual to the electronic business system organization as a function of the purchase.

2. The method of claim 1 further comprising the plurality of affiliate organization providers providing a discount to the purchase as a function of the purchase being from the first Affinity partner or the second Affinity partner module.

3. The method of claim 1 further comprising providing a portion of the residuals of the electronic business system to the first Affinity partner module or the second Affinity partner module.

\* \* \* \* \*